(12) United States Patent
Nagase et al.

(10) Patent No.: US 9,194,990 B2
(45) Date of Patent: Nov. 24, 2015

(54) LAMINATED OPTICAL FILM

(75) Inventors: Junichi Nagase, Ibaraki (JP); Tomonari Naito, Ibaraki (JP); Mika Okada, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 737 days.

(21) Appl. No.: 12/842,104

(22) Filed: Jul. 23, 2010

(65) Prior Publication Data

US 2011/0025963 A1    Feb. 3, 2011

(30) Foreign Application Priority Data

Jul. 29, 2009   (JP) .................... 2009-176101

(51) Int. Cl.
*C09K 19/00* (2006.01)
*G02B 5/30* (2006.01)
*G02F 1/13363* (2006.01)

(52) U.S. Cl.
CPC .......... *G02B 5/3083* (2013.01); *G02F 1/13363* (2013.01); *G02F 2413/02* (2013.01); *Y10T 428/10* (2015.01); *Y10T 428/1036* (2015.01); *Y10T 428/1059* (2015.01)

(58) Field of Classification Search
CPC .... G02B 5/3083; G02B 5/3041; G02B 5/305; G02F 2413/02; G02F 2001/133635; G02F 1/13363; G02F 1/133634; G02F 1/1393; B32B 2307/42; B32B 7/12; C09J 7/0207; C09J 7/0246; C09J 7/0296; C09J 2201/12; C09J 2201/122; Y10T 428/10; Y10T 428/1036; Y10T 428/105; Y10T 428/1059; Y10T 428/1077; Y10T 428/1082
USPC ........ 428/1.1, 1.3, 1.31, 1.33, 1.5, 1.51, 1.54, 428/1.55; 349/96, 117, 118; 156/325
See application file for complete search history.

(56) References Cited

U.S. PATENT DOCUMENTS

| | | | |
|---|---|---|---|
| 7,522,238 B2 | 4/2009 | Matsuoka | |
| 7,643,118 B2 | 1/2010 | Nagase et al. | |
| 7,920,230 B2 | 4/2011 | Matsuoka | |
| 2003/0102081 A1* | 6/2003 | Hosokawa et al. | 156/331.8 |
| 2005/0243252 A1 | 11/2005 | Matsuoka | |
| 2005/0266239 A1 | 12/2005 | Satake et al. | |
| 2009/0017298 A1* | 1/2009 | Okada et al. | 428/354 |
| 2009/0109385 A1 | 4/2009 | Nagase et al. | |
| 2009/0178756 A1 | 7/2009 | Matsuoka | |

FOREIGN PATENT DOCUMENTS

| | | |
|---|---|---|
| JP | 3141503 B2 | 3/2001 |
| JP | 2004-294983 A | 10/2004 |
| JP | 2005-227427 A | 8/2005 |

(Continued)

OTHER PUBLICATIONS

Machine translation of JP 05-281417, Jul. 2012.*

(Continued)

*Primary Examiner* — Ruiyun Zhang
(74) *Attorney, Agent, or Firm* — Westerman, Hattori, Daniels & Adrian, LLP

(57) ABSTRACT

A laminated optical film according to an embodiment of the present invention includes a polarizing plate and a retardation layer formed of a water dispersible pressure-sensitive adhesive composition containing an inorganic laminar compound.

9 Claims, 1 Drawing Sheet

(56) References Cited

FOREIGN PATENT DOCUMENTS

| | | |
|---|---|---|
| JP | 2005-309290 A | 11/2005 |
| JP | 2006-047494 A | 2/2006 |
| JP | 2006-251644 A | 9/2006 |
| JP | 2008-009389 A | 1/2008 |
| JP | 2008-303275 A | 12/2008 |
| JP | 2009-062264 A | 3/2009 |

OTHER PUBLICATIONS

Japanese Office Action dated May 8, 2013, issued in corresponding Japanese Patent Application No. 2009-176101, w/ English translation (8 pages).

Japanese Office Action dated Jan. 29, 2014, issued in corresponding Japanese Patent Application No. 2009-176101, w/English translation, (8 pages).

* cited by examiner

LAMINATED OPTICAL FILM

This application claims priority under 35 U.S.C. Section 119 to Japanese Patent Application No. 2009-176101 filed on Jul. 29, 2009, which is herein incorporated by reference.

BACKGROUND OF THE INVENTION

1. Field of the Invention

The present invention relates to a laminated optical film and a liquid crystal panel using the film, and a liquid crystal display apparatus.

2. Description of the Related Art

Optical films have been generally used in liquid crystal display apparatuses for performing optical compensation. For example, films each using an inorganic laminar compound have been proposed as the optical films (for example, Japanese Patent No. 3,141,503). The use of a cellulose-based resin, a polyvinyl alcohol-based resin, or the like has been proposed for forming the inorganic laminar compound into a film. However, those resins each involve the following problem. That is, the resins each contain a large number of hydrophilic functional groups. Accordingly, when the resins are each combined with the inorganic laminar compound containing a hydrophilic functional group, the resins each thicken owing to an interaction with the compound, thereby making it difficult to perform cast film formation. As a result, the following problem arises. That is, it is difficult to obtain an excellent optical compensation function. Meanwhile, an abrupt cost reduction has been progressing in a liquid crystal panel market.

SUMMARY OF THE INVENTION

The present invention has been made to solve the above-mentioned conventional problems, and a main object of the present invention is to provide a laminated optical film having an excellent optical compensation function by favorably forming an inorganic laminar compound into a film.

According to one aspect of the present invention, a laminated optical film is provided. The laminated optical film includes a polarizing plate and a retardation layer formed of a water dispersible pressure-sensitive adhesive composition containing an inorganic laminar compound.

In one embodiment of the present invention, the retardation layer has relationships represented by the following expressions (1) and (2):

$$0.94 \leq R45[450]/R45[550] \leq 1.06 \quad (1)$$

$$0.94 \leq R45[650]/R45[550] \leq 1.06 \quad (2)$$

where R45[450], R45[550], and R45[650] represent retardation values measured by tilting the layer by 45° from its normal direction at 23° C. and wavelengths of 450 nm, 550 nm, and 650 nm, respectively.

In another embodiment of the present invention, the retardation layer has a refractive index anisotropy of nx=ny>nz.

In still another embodiment of the present invention, the retardation layer has a thickness direction birefringence index Δnxz of 0.002 to 0.02.

In still another embodiment of the present invention, the retardation layer has a thickness of 1 to 50 μm.

In still another embodiment of the present invention, the inorganic laminar compound includes at least one kind of a clay-based mineral selected from the group consisting of a kaolinite group, an antigorite group, a smectite group, a vermiculite group, and a mica group.

In still another embodiment of the present invention, the inorganic laminar compound is subjected to a hydrophobic treatment.

In still another embodiment of the present invention, a resin component in the water dispersible pressure-sensitive adhesive composition includes at least one resin selected from the group consisting of a (meth)acrylic resin, a polyurethane-based resin, a polyester-based resin, a phenol resin, an ethylene-vinyl acetate resin, an epoxy resin, and a silicone resin.

In still another embodiment of the present invention, the resin component includes a (meth)acrylic resin.

Instill another embodiment of the present invention, a content of the inorganic laminar compound in the retardation layer is 10 to 200 parts by weight with respect to 100 parts by weight of a resin solid content.

According to another aspect of the present invention, a liquid crystal panel is provided. The liquid crystal panel includes a liquid crystal cell and the laminated optical film.

According to still another aspect of the present invention, a liquid crystal display apparatus is provided. The liquid crystal display apparatus includes the liquid crystal panel.

According to still another aspect of the present invention, a method of producing a laminated optical film is provided. The method includes forming a retardation layer by applying a water dispersible pressure-sensitive adhesive composition containing an inorganic laminar compound on a base material and laminating the retardation layer on a polarizing plate.

According to the present invention, the inorganic laminar compound can be favorably formed into a film by using the water dispersible pressure-sensitive adhesive composition, and hence the retardation layer having an excellent optical compensation function can be formed. In addition, the resultant retardation layer functions as a pressure-sensitive adhesive layer as well. As a result, the retardation layer contributes to the thinning of the liquid crystal panel. Further, a production process for the panel is simplified, and hence a cost reduction can be achieved.

DETAILED DESCRIPTION OF THE PREFERRED EMBODIMENTS

Hereinafter, preferred embodiments of the present invention are described. However, the present invention is not limited to these embodiments.

DEFINITIONS OF TERMS AND SYMBOLS

Definitions of terms and symbols in the description of the present invention are described below.

(1) The symbol "nx" refers to a refractive index in a direction providing a maximum in-plane refractive index (that is, slow axis direction), the symbol "ny" refers to a refractive index in a direction perpendicular to the slow axis in the plane (that is, fast axis direction), and the symbol "nz" refers to a refractive index in a thickness direction.

(2) The term "in-plane retardation value (Re[λ])" refers to the in-plane retardation value of a film (layer) at 23° C. and a wavelength of λ (nm). When the thickness of the film (layer) is represented by d (nm), the Re[λ] is determined by the expression "Re[λ]=(nx−ny)×d."

(3) The term "R45[λ]" refers to a retardation value measured by tilting a layer (film) by 45° from its normal direction at 23° C. and a wavelength of λ (nm).

(4) The term "thickness direction birefringence index (Δnxz)" refers to the thickness direction birefringence index of a film (layer) at 23° C. and a wavelength of 590 (nm). The Δnxz is determined by the expression "Δnxz=nx−nz."

(5) The term "thickness direction retardation value (Rth [λ])" refers to the thickness direction retardation value of a film (layer) at 23° C. and a wavelength of λ (nm). When the thickness of the film (layer) is represented by d (nm), the Rth[λ] is determined by the expression "Rth[λ]=(nx−nz)×d."

A. Entire Constitution of Laminated Optical Film

Figure 1:
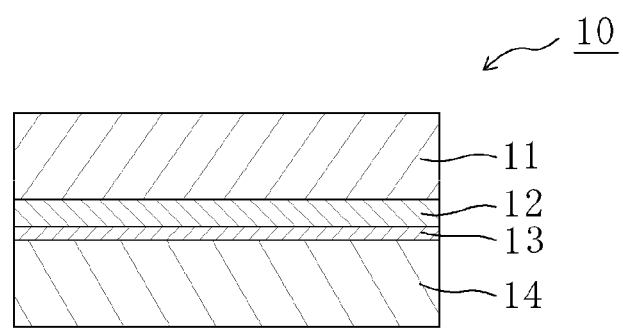
FIG. 1 is a schematic sectional view of a laminated optical film according to a preferred embodiment of the present invention.

FIG. 1 is a schematic sectional view of a laminated optical film 10 according to a preferred embodiment of the present invention. The laminated optical film 10 has a base material 11, a retardation layer 12, an under coat layer 13, and a polarizing plate 14 in the stated order. The retardation layer 12 is formed of a water dispersible pressure-sensitive adhesive composition containing an inorganic laminar compound. The use of the water dispersible pressure-sensitive adhesive composition allows one to form the inorganic laminar compound into a film favorably, and the resultant retardation layer has an extremely excellent optical compensation function. In addition, the resultant retardation layer functions as a pressure-sensitive adhesive layer as well. Although the pressure-sensitive adhesive layer is formed of an organic solvent-based pressure-sensitive adhesive in ordinary cases, the use of the water dispersible pressure-sensitive adhesive composition contributes to the curtailment of an environmental load and a solvent cost. The under coat layer 13 is provided between the polarizing plate 14 and the retardation layer 12 in the laminated optical film 10. Providing the under coat layer 13 can improve an adhesive strength (anchoring force) between the retardation layer 12 and the polarizing plate 14. Although not illustrated, the laminated optical film of the present invention may further have another retardation layer (film). Hereinafter, each layer is described.

A-1. Retardation Layer

As described above, the above-mentioned retardation layer is formed of the water dispersible pressure-sensitive adhesive composition containing the inorganic laminar compound. Specific examples of the inorganic laminar compound include clay-based minerals. The clay-based minerals are classified into a type formed of a two-layer structure having, on the tetrahedral layer of silica, an octahedral layer using aluminum, magnesium, or the like as a central metal and a type formed of a three-layer structure having the tetrahedral layers of silica on both sides of the octahedral layer using aluminum, magnesium, or the like as a central metal. Examples of the former type include a kaolinite group and an antigorite group. Examples of the latter type include a smectite group, a vermiculite group, and a mica group depending on the number of ion-exchange cations. Specific examples of the minerals include kaolinite, dickite, nacrite, halloysite, antigorite, chrysotile, pyrophyllite, montmorillonite, hectorite, sodium tetrasilicic mica, sodium taeniolite, white mica, margarite, talc, vermiculite, bronze mica, xanthophyllite, and chlorite. Of those, the smectite group is preferred. The use of the smectite group can provide a retardation layer additionally excellent in transparency.

The above-mentioned inorganic laminar compound is preferably subjected to a complex (hydrophobic) treatment with an organic compound. For example, each of the above-mentioned clay-based minerals ordinarily has the oxygen atom or hydroxyl group of Si—O, Si—OH, or Al—OH on its surface, and a gap between its crystal layers is occupied with an exchangeable cation and its aquo-ion. The inorganic laminar compound can be complexed with the organic compound by a method involving causing the oxygen atom or hydroxyl group to react with the organic compound or a method involving exchanging the exchangeable cation with an organic cation. With such treatment, when anyone of the clay-based minerals is compounded into a dispersion to be described later, a monomer component is infiltrated into a gap between the layers of the clay-based mineral to swell the clay-based mineral. As a result, the clay-based mineral can be surely dispersed. In addition, a retardation layer extremely excellent in transparency can be obtained.

Examples of the above-mentioned organic compounds include amine compounds. Examples of the amine compounds include quaternary ammonium compounds, urea, hydrazine, and dodecylpyridinium. Of those, the quaternary ammonium compounds are preferred because they can easily perform cation exchange. Quaternary ammonium compounds may be introduced as a cation. Examples of such cations include those having an alkyl group or benzyl group such as dimethyl dioctadecyl ammonium ion, dimethyl benzyl octadecyl ammonium ion, and trioctyl methyl ammonium ion; and those having a long-chain substituent such as methyl diethyl polyoxypropylene (polymerization degree: 25) ammonium ion.

A commercially available product can be used as it is as the clay-based mineral complexed with the organic compound described above. For example, any one of Rusentaito series (manufactured by Co-op Chemical Co., Ltd.) is used as the commercially available product. To be additionally specific, examples of the commercially available product include a Rusentaito SPN, a Rusentaito SAN, a Rusentaito SEN, and a Rusentaito STN.

Each layer of the inorganic laminar compound has a thickness of, for example, 0.5 to 2 nm, or specifically about 1 nm. The length (maximum length) of each layer is preferably 100 nm or less, or more preferably 60 nm or less. When the length of each layer exceeds 100 nm, a reduction in transparency or a reduction in polymerization stability may occur.

The inorganic laminar compound is compounded at a ratio of preferably 10 to 200 parts by weight, more preferably 30 to 180 parts by weight, or particularly preferably 40 to 150 parts by weight with respect to 100 parts by weight of a monomer component to be described later. To be specific, the content of the inorganic laminar compound in the formed retardation layer is preferably 10 to 200 parts by weight, more preferably 30 to 180 parts by weight, or particularly preferably 40 to 150 parts by weight with respect to 100 parts by weight of a resin solid content. Compounding the inorganic laminar compound at such ratio can provide a retardation layer that sufficiently brings together an excellent optical compensation function and a pressure-sensitive adhesive function. Adjusting the amount in which the inorganic laminar compound is compounded can provide desired optical properties (such as a thickness direction birefringence index).

A resin component in the above-mentioned water dispersible pressure-sensitive adhesive composition is, for example, a (meth)acrylic resin, a polyurethane-based resin, a polyester-based resin, a phenol resin, an ethylene-vinyl acetate resin, an epoxy resin, or a silicone resin. Of those, the (meth)acrylic resin excellent in flexibility, adhesion, and durability is preferred. Further, a (meth)acrylic resin containing a functional group is preferred because of its excellent reactivity. It should be noted that the term "(meth)acrylic resin" refers to at least one of an acrylic resin and a methacrylic resin.

Any appropriate (meth)acrylic monomer is used as the monomer component of which the above-mentioned (meth) acrylic resin is constituted. An alkyl(meth)acrylate ester is preferably used. The alkyl group of the alkyl(meth)acrylate ester preferably has 4 to carbon atoms. Specific examples thereof include butyl(meth)acrylate, isobutyl(meth)acrylate, sec-butyl(meth)acrylate, t-butyl(meth)acrylate, pentyl(meth) acrylate, neopentyl(meth)acrylate, isoamyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth) acrylate, isodecyl(meth)acrylate, undecyl(meth)acrylate, dodecyl(meth)acrylate, tridecyl(meth)acrylate, tetradecyl (meth)acrylate, pentadecyl(meth)acrylate, hexadecyl(meth) acrylate, heptadecyl(meth)acrylate, and octadecyl(meth) acrylate. Of those, butyl acrylate is preferred. One kind of them can be used alone, or two or more kinds of them can be used in combination. For example, butyl acrylate and 2-ethylhexyl acrylate can be used in combination, and a compounding ratio (weight ratio) between them is, for example, 1/99 to 55/45 (butyl acrylate/2-ethylhexyl acrylate) or preferably 5/95 to 60/40.

As described later, any other component except the above-mentioned (meth)acrylic monomer can be used as a constituent of the above-mentioned (meth)acrylic resin. In this case, the (meth)acrylic monomer is compounded at a ratio of preferably 60 to 99 parts by weight, more preferably 70 to 99 parts by weight, or particularly preferably 80 to 99 parts by weight with respect to 100 parts by weight of monomer components.

Any other component as well as the above-mentioned component can be used as a constituent of the above-mentioned (meth)acrylic resin. A carboxyl group-containing vinyl monomer or a phosphate group-containing vinyl monomer is preferably used as the other component.

When the above-mentioned carboxyl group-containing vinyl monomer is used, a cross-link point (carboxyl group) to be thermally cross-linked is introduced, and hence the adhesion of the retardation layer to the substrate can be improved. Examples of the carboxyl group-containing vinyl monomer include unsaturated carboxylic acids such as (meth)acrylic acid, fumaric acid, maleic acid, itaconic acid, crotonic acid, and cinnamic acid; unsaturated dicarboxylic acid monoesters such as monomethyl itaconate, monobutyl itaconate, and 2-acryloyloxyethylphthalic acid; unsaturated tricarboxylic acid monoesters such as 2-methacryloyloxyethyltrimellitic acid and 2-methacryloyloxyethylpyromellitic acid; and carboxyalkyl acrylates such as carboxyethyl acrylate (including β-carboxyethyl acrylate) and carboxypentyl acrylate. Further, examples of the carboxyl group-containing vinyl monomer include unsaturated dicarboxylic acid anhydrides such as itaconic anhydride, maleic anhydride, and fumaric anhydride. Those carboxyl group-containing vinyl monomers may be used alone or in combination. Of those, acrylic acid and carboxyethyl acrylate are preferred.

The carboxyl group concentration of the carboxyl group-containing vinyl monomer in the monomer component is, for example, from 0.05 to 1.50 mmol/g, and preferably from 0.20 to 0.90 mmol/g. To adjust the carboxyl group concentration of the carboxyl group-containing vinyl monomer within the above-mentioned range, the compounding ratio of the carboxyl group-containing vinyl monomer is set to, for example, 0.4 to 41 parts by weight, and preferably 1.4 to 25 parts by weight with respect to 100 parts by weight of the monomer component, although it varies depending on the molecular weight of the carboxyl group-containing vinyl monomer. The compounding ratio of the carboxyl group-containing vinyl monomer can also be set to, for example, 0.5 to 15 parts by weight, preferably from 0.5 to 10 parts by weight with respect to 100 parts by weight of the monomer component, within the above-mentioned carboxyl group concentration. When the amount of the monomer is less than the above-mentioned range, the cohesive force of the water dispersible pressure-sensitive adhesive composition may decrease. On the other hand, when the amount is more than the above-mentioned range, stability upon emulsion polymerization and water resistance of the water dispersible pressure-sensitive adhesive composition may deteriorate.

It should be noted that the above-mentioned carboxyl group concentration of the carboxyl group-containing vinyl monomer is calculated by the following equation:

Carboxyl group concentration (mmol/g)= 1000×{(compounding weight (g) of carboxyl group-containing vinyl monomer)/(molecular weight (g/mol) of carboxyl group-containing vinyl monomer)}/(weight (g) of monomer component)

Examples of the above-mentioned phosphoric acid group-containing vinyl monomer include a polyalkylene oxide (meth)acrylate phosphate ester represented by the following general formula (1):

[Chem 1]

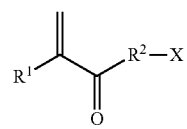

(1)

(in the general formula (1), $R^1$ represents a hydrogen atom or a methyl group, $R^2$ represents a polyoxyalkylene group, and X represents a phosphoric acid group or a salt thereof.)

The polyoxyalkylene group represented by $R^2$ is represented by the following general formula (2):

[Chem 2]

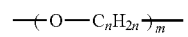

(2)

Preferably, in the general formula (2), n represents an integer of 1 to 4, and m represents an integer of 2 or more. Specific examples of $R^2$ include a polyoxyethylene group, a polyoxypropylene group, and a random, block, or graft unit of an oxyethylene group and an oxypropylene group. The polymerization degree of the oxyalkylene groups, namely m in the general formula (2), is preferably 4 or more, and usually 40 or less. When the polymerization degree of the oxyalkylene group is higher, mobility of a side chain having the phosphoric acid group increases, and interaction with substrate can rapidly proceed, and thus adhesion of the water dispersible pressure-sensitive adhesive composition to a substrate can be improved.

The phosphoric acid group or a salt thereof represented by X is, for example, represented by the following general formula (3):

[Chem 3]

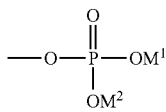

(3)

(in the general formula (3), $M^1$ and $M^2$ each independently represent a hydrogen atom or a cation.)

The examples of the above-mentioned cation include inorganic cations of alkali metals such as sodium and potassium, alkali earth metals such as calcium and magnesium, or the like; and organic cations of quaternary amines or the like.

As the above-mentioned phosphoric acid group-containing vinyl monomer, commercially available products can be used as they are. Examples of the commercially available products include mono[poly(ethylene oxide)methacrylate]phosphate esters such as Sipomer PAM-100 (manufactured by Rhodia Nicca, Ltd.), Phosmer PE (manufactured by Uni-Chemical Co., Ltd.), Phosmer PEH (manufactured by Uni-Chemical Co., Ltd.), and Phosmer PEDM (manufactured by Uni-Chemical Co., Ltd.); and mono[poly(propylene oxide)methacrylate]phosphate esters such as Sipomer PAM-200 (manufactured by Rhodia Nicca, Ltd.), Phosmer PP (manufactured by Uni-Chemical Co., Ltd.), Phosmer PPH (manufactured by Uni-Chemical Co., Ltd.), and Phosmer PPDM (manufactured by Uni-Chemical Co., Ltd.).

The phosphoric acid group concentration of the phosphoric acid group-containing vinyl monomer in the monomer component is, for example, 0.01 to 0.45 mmol/g, and preferably 0.02 to 0.20 mmol/g. To adjust the phosphoric acid group concentration of the phosphoric acid group-containing vinyl monomer within the above-mentioned range, the compounding ratio of the phosphoric acid group-containing vinyl monomer is set to, for example, 0.4 to 22 parts by weight, and preferably 0.8 to 10 parts by weight with respect to 100 parts by weight of the monomer component, although it varies depending on the molecular weight of the phosphoric acid group-containing vinyl monomer. The compounding ratio of the phosphoric acid group-containing vinyl monomer can also be set to, for example, 0.5 to 20 parts by weight, and preferably 0.5 to 10 parts by weight with respect to 100 parts by weight of the monomer component, within the above-mentioned phosphoric acid group concentration. When the amount of the monomer is less than the above-mentioned range, sufficient effect of improving adhesive strength to the substrate may not be achieved. On the other hand, when the amount is more than the above-mentioned range, stability in emulsion polymerization described below may deteriorate and adhesion may deteriorate due to an excessive increase in elastic modulus of the water dispersible pressure-sensitive adhesive composition.

It should be noted that the phosphoric acid group concentration of the phosphoric acid group-containing vinyl monomer is calculated by the following equation:

Phosphoric acid group concentration (mmol/g)=1000× {(compounding weight (g) of phosphoric acid group-containing vinyl monomer)/(molecular weight (g/mol) of phosphoric acid group-containing vinyl monomer)}/(weight (g) of monomer component)

Any copolymerizable vinyl monomers other than those described above can be used as a constituent of the above-mentioned (meth)acrylic resin. Examples of the copolymerizable vinyl monomer include functional group-containing vinyl monomers other than the carboxyl group-containing vinyl monomer. Specific examples thereof include vinyl carboxylate esters such as vinyl acetate and vinyl propionate; hydroxyl group-containing vinyl monomers such as 2-hydroxyethyl acrylate, 2-hydroxypropyl acrylate, and 2-hydroxybutyl acrylate; amide group-containing unsaturated monomers such as (meth)acrylamide, N,N-dimethyl(meth)acrylamide, N,N-diethyl(meth)acrylamide, N-isopropyl(meth)acrylamide, N-butyl(meth)acrylamide, N-methoxymethyl(meth)acrylamide, N-methylol(meth)acrylamide, N-methylolpropane(meth)acrylamide, and N-vinylcarboxylic acid amide; amino group-containing unsaturated monomers such as aminoethyl(meth)acrylate, N,N-dimethylaminoethyl(meth)acrylate, and t-butylaminoethyl(meth)acrylate; glycidyl group-containing unsaturated monomers such as glycidyl(meth)acrylate and methyl glycidyl(meth)acrylate; cyano group-containing unsaturated monomers such as acrylonitrile and methacrylonitrile; isocyanate group-containing unsaturated monomers such as 2-methacryloyloxyethyl isocyanate; sulfonic acid group-containing unsaturated monomers such as styrenesulfonic acid, allylsulfonic acid, 2-(meth)acrylamide-2-methylpropanesulfonic acid, (meth)acrylamidepropanesulfonic acid, sulfopropyl(meth)acrylate, and (meth)acryloyloxynaphthalene sulfonic acid; maleimide-based monomers such as N-cyclohexylmaleimide, N-isopropylmaleimide, N-laurylmaleimide, and N-phenylmaleimide; itaconimide-based monomers such as N-methylitaconimide, N-ethylitaconimide, N-butylitaconimide, N-octylitaconimide, N2-ethylhexylitaconimide, N-cyclohexylitaconimide, and N-laurylitaconimide; succinimide-based monomers such as N-(meth)acryloyloxymethylene succinimide, N-(meth)acryloyl-6-oxyhexamethylenesuccinimide, and N-(meth)acryloyl-8-oxyoctamethylenesuccinimide; and glycol-based acryl ester monomers such as (meth)acrylic acid polyethylene glycol, (meth)acrylic acid polypropylene glycol, (meth)acrylic acid methoxyethylene glycol, and (meth)acrylic acid methoxypolypropylene glycol.

Further, examples of the above-mentioned functional group-containing vinyl monomer include polyfunctional monomer. Examples of the polyfunctional monomer include (meth)acrylic ester monomers of polyalcohol including (mono or poly)alkylene glycol di(meth)acrylates, for example, (mono or poly)ethylene glycol di(meth)acrylates such as ethylene glycol di(meth)acrylate, diethylene glycol di(meth)acrylate, triethylene glycol di(meth)acrylate, trimethylolpropane tri(meth)acrylate, and tetraethylene glycol di(meth)acrylate, and (mono or poly)propylene glycol di(meth)acrylates such as propylene glycol di(meth)acrylate, neopentyl glycol di(meth)acrylate, 1,6-hexanediol di(meth)acrylate, pentaerythritol di(meth)acrylate, trimethylolpropane tri(meth)acrylate, pentaerythritol tri(meth)acrylate, dipentaerythritol hexa(meth)acrylate; and divinyl benzene. Examples of the polyfunctional monomer also include epoxy acrylate, polyester acrylate, and urethane acrylate.

Further, examples of the copolymerizable vinyl monomer include, in addition to the above-mentioned functional group-containing vinyl monomers, aromatic vinyl monomers such as styrene and vinyltoluene; (meth)acrylic acid alicyclic hydrocarbon esters such as cyclopentyl di(meth)acrylate, cyclohexyl(meth)acrylate, bornyl(meth)acrylate, and isobornyl(meth)acrylate; aryl(meth)acrylate esters such as phenyl(meth)acrylate; alkoxy group-containing unsaturated monomers such as methoxyethyl(meth)acrylate and ethoxyethyl(meth)acrylate; olefin-based monomers such as ethylene, propylene, isoprene, butadiene, and isobutylene; vinyl ether-based monomers such as vinyl ether; halogen atom-containing unsaturated monomers such as vinyl chloride; vinyl group-containing heterocyclic compounds such as N-vinyl pyrrolidone, N-(1-methylvinyl) pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholin, and tetrahydrofurfuryl(meth)acrylate; and acrylate ester-based monomers containing a halogen atom such as fluorine atom, such as fluorine(meth)acrylate.

Further, examples of the above-mentioned copolymerizable vinyl monomer include alkoxysilyl group-containing vinyl monomer. Examples of the alkoxysilyl group-containing vinyl monomer include silicone-based (meth)acrylate monomer and silicone-based vinyl monomer.

Examples of the above-mentioned silicone-based (meth) acrylate monomer include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, and 3-(meth)acryloyloxypropyl-tributoxysilane; (meth)acryloyloxyalkyl-alkyldialkoxysilanes such as (meth)acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane, and 3-(meth)acryloyloxypropyl-propyldiethoxysilane; and (meth)acryloyloxyalkyl-dialkyl (mono)alkoxysilanes corresponding to those monomers.

Examples of the above-mentioned silicone-based vinyl monomer include vinyltrialkoxysilanes such as vinyltrimethoxysilane, vinyltriethoxysilane, vinyltripropoxysilane, vinyltriisopropoxysilane, and vinyltributoxysilane, and vinylalkyldialkoxysilane and vinyldialkylalkoxysilane corresponding to those monomers; vinylalkyltrialkoxysilanes such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane, and γ-vinylpropyltributoxysilane, and (vinylalkyl)alkyldialkoxysilane and (vinylalkyl)dialkyl(mono)alkoxysilane corresponding to those monomers.

The above-mentioned copolymerizable vinyl monomers may be used alone or in combination. Of those copolymerizable vinyl monomers, the alkoxysilyl group-containing vinyl monomer is preferred. By using the alkoxysilyl group-containing vinyl monomer, alkoxysilyl groups are introduced in the polymer chain and a crosslinked structure can be formed by the reaction between them. Particularly in the water dispersible pressure-sensitive adhesive composition, an ununiform crosslinked structure is formed by using the cross-linking agent described below, and hence terminal peeling may more easily occur. However, when the alkoxysilyl group-containing monomer is used, a uniform crosslinked structure can be formed and thus adhesion and fixation to the substrate can be improved. Further, adhesion to the substrate can be enhanced by an interaction between the alkoxysilyl group and the substrate.

The copolymerizable vinyl monomer is compounded at a ratio of, for example, 40 parts by weight or less, preferably 30 parts by weight or less, or more preferably 20 parts by weight or less with respect to 100 parts by weight of the monomer components. Further, in the case where the copolymerizable vinyl monomer is a functional group-containing vinyl monomer, the compounding ratio thereof is, for example, 0.5 to 12 parts by weight, and preferably 1 to 8 parts by weight with respect to 100 parts by weight of the monomer component. When the copolymerizable vinyl monomer is an alkoxysilyl group-containing vinyl monomer, the compounding ratio thereof is, for example, 0.001 to 1 part by weight, and preferably 0.01 to 0.1 part by weight with respect to 100 parts by weight of the monomer component. When the amount of the alkoxysilyl group-containing vinyl monomer is less than the above-mentioned range, a cohesive force of the water dispersible pressure-sensitive adhesive composition may decrease and adhesion between the water dispersible pressure-sensitive adhesive composition and the substrate can not be improved because of poor crosslinking of the alkoxysilyl group. On the other hand, when the amount is more than the above-mentioned range, stability in emulsion polymerization and adhesion may deteriorate.

The total compounding ratio of the carboxyl group-containing vinyl monomer, the phosphoric acid group-containing vinyl monomer, and the copolymerizable vinyl monomer of the monomer component described above is, for example, 1 to 40 parts by weight, and preferably 1 to 30 parts by weight with respect to 100 parts by weight of the monomer component.

The above-mentioned water dispersible pressure-sensitive adhesive composition is preferably prepared by: preparing a dispersion containing the above-mentioned inorganic laminar compound and the monomer components of which the above-mentioned resin component is constituted; emulsifying the dispersion to prepare an emulsion; and polymerizing the monomer components in the emulsion.

A hydrophobic compound insoluble or hardly soluble in water and soluble in the monomer components can be compounded into the above-mentioned dispersion. Examples of the hydrophobic compound include: higher alkanes each having 8 to 30 carbon atoms such as dodecane, hexadecane, and octadecane; higher alcohols each having an alkyl group having 8 to 30 carbon atoms such as lauryl alcohol, cetyl alcohol, and stearyl alcohol; alkyl(meth)acrylates each having an alkyl group having 8 to 30 carbon atoms such as lauryl(meth)acrylate and stearyl(meth)acrylate; thiols each having an alkyl group having 8 to 30 carbon atoms such as lauryl mercaptan, cetyl mercaptan, and stearyl mercaptan; and polymers such as polystyrene and polymethyl(meth)acrylate. One kind of those hydrophobic compounds can be used alone, or two or more kinds of them can be used in combination. Of those, the higher alkanes are preferred.

The hydrophobic compound is compounded at a ratio of, for example, 1 to 30 parts by weight with respect to 100 parts by weight of the monomer components. Compounding the hydrophobic compound into the dispersion allows oil droplets in the above-mentioned emulsion to be easily adjusted so that the oil droplets may have a median diameter to be described later.

The dispersion is prepared, for example, by: mixing the inorganic laminar compound and the monomer components, and as required, the hydrophobic compound; and performing stirring with a stirring apparatus such as a disperser, a homomixer, or a stirrer simultaneously with or after the mixing of them. As a result, the inorganic laminar compound can be dispersed in the monomer components.

The above-mentioned emulsion is prepared, for example, by: mixing the above-mentioned dispersion and water, and as required, an emulsifier; and performing emulsification with an emulsifying apparatus simultaneously with or after the mixing of them.

Examples of the above-mentioned emulsifier include anionic emulsifiers such as sodium lauryl sulfate, ammonium lauryl sulfate, sodium dodecylbenzenesulfonate, polyoxyethylene sodium lauryl sulfate, sodium polyoxyethylene alkyl ether sulfate, ammonium polyoxyethylene alkyl phenyl ether sulfate, sodium polyoxyethylene alkyl phenyl ether sulfate, and sodium polyoxyethylene alkyl sulfosuccinate; and nonionic emulsifiers such as polyoxyethylene alkyl ether, polyoxyethylene alkyl phenyl ether, polyoxyethylene fatty acid ester, and polyoxyethylene polyoxypropylene block polymer. The examples of the emulsifier further include radical polymerizable (reactive) emulsifiers in which a radical polymerizable functional group (reactive group) such as propenyl group or allyl ether group is introduced into the anionic emulsifier or the nonionic emulsifier. Those emulsifiers may be used alone or in combination.

The compounding ratio of the emulsifier is, for example, 0.2 to 10 parts by weight, and preferably from 0.5 to 5 parts by weight with respect to 100 parts by weight of the monomer component.

Specific examples of the above-mentioned emulsifying apparatus include an ultrasonic homogenizer, a high-pressure homogenizer (PANDA 2K manufactured by NIRO-SOAVI), a Microfluidizer (manufactured by Microfluidics), a Nanomizer (manufactured by YOSHIDA KIKAI CO., LTD.), a T.K. Homomixer (manufactured by PRIMIX Corporation), and a T.K. Filmix (manufactured by PRIMIX Corporation). An ultrasonic wave to be used in the ultrasonic homogenizer has a frequency of, for example, 20 to 40 kHz. In the ultrasonic homogenizer, the oil droplets are reduced in size by a cavitation effect based on irradiation with the ultrasonic wave. A pressure to be applied in each of the high-pressure homogenizer, the Microfluidizer, and the Nanomizer is, for example, 10 to 300 MPa. In each of the high-pressure homogenizer, the Microfluidizer, and the Nanomizer, a mixed liquid of the dispersion, the emulsifier, and water is ejected from fine pores while being pressurized, and the oil droplets are reduced in size by a cavitation effect exerted in the ejection and the application of a high shearing force. The T.K. Homomixer and the T.K. Filmix are each an emulsifying apparatus that utilizes high-speed rotation of a rotator. The high-speed rotation of the rotator in the mixed liquid applies a high shearing force to the mixed liquid, and hence the oil droplets are reduced in size. One kind of those emulsifying apparatuses can be used alone, or two or more kinds of them can be used in combination in multiple stages.

The oil droplets of the emulsion described above have a median diameter on a volume basis of preferably 50 to 500 nm, more preferably 50 to 400 nm, or particularly preferably 50 to 300 nm. When the median diameter of the oil droplets outstrips the above-mentioned range, there is a possibility that the polymerization stability reduces and the oil droplets cohere during the polymerization. On the other hand, when the median diameter of the oil droplets falls short of the above-mentioned range, there is a possibility that the inorganic laminar compound is not captured by the oil droplets and coheres during the polymerization.

It should be noted that the median diameter on a volume basis of the oil droplets in the emulsion described above is measured with a laser diffraction type grain size distribution-measuring apparatus. For example, an LS13320 (manufactured by Beckman Coulter, Inc.) is used as the laser diffraction type grain size distribution-measuring apparatus. Measurement conditions are as described below. That is, a laser diode and a tungsten lamp are each used as a laser light source, and a wavelength of 450 to 900 nm is adopted.

The monomer components in the emulsion described above are typically polymerized in the presence of an initiator. For example, a water-soluble initiator or an oil-soluble initiator is used as the initiator.

Examples of the above-mentioned water-soluble initiator include azo-based initiators such as 2,2'-azobis(2-methylpropioneamidine)disulfate, 2,2'-azobis(2-methylpropioneamidine)dihydrochloride, 2,2'-azobis(2-amidinopropane)dihydrochloride, 2,2'-azobis[N-(2-carboxyethyl)-2-methylpropioneamidine]hydrate, 2,2'-azobis(N,N'-dimethyleneisobutylamidine), and 2,2'-azobis[2-(2-imidazolin-2-yl)propane]dihydrochloride (excluding oil-soluble azo-based initiators); persulfate-based initiators such as potassium persulfate and ammonium persulfate; peroxide-based initiators such as t-butyl hydroperoxide and hydrogen peroxide (excluding oil-soluble peroxide-based initiators); substituted ethane-based initiators such as phenyl-substituted ethane; carbonyl-based initiators such as aromatic carbonyl compound; and redox-based initiators such as combination of persulfate and sodium hydrogen sulfite and combination of peroxide and sodium ascorbate. Examples of the above-mentioned oil-soluble initiator include: oil-soluble, peroxide-based initiators such as benzoyl peroxide and lauroyl peroxide; and oil-soluble, azo-based initiators such as 2,2'-azobisisobutyronitrile and azobis(2-methylbutyronitrile). One kind of those polymerization initiators can be used alone, or two or more kinds of them can be used in combination. Of those, a water-soluble initiator is preferably used, and a redox-based initiator is more preferably used.

The initiator is compounded at a ratio of, for example, 0.005 to 1 part by weight with respect to 100 parts by weight of the monomer components.

A chain transfer agent is compounded as required into the emulsion upon polymerization. Compounding the chain transfer agent can adjust the molecular weight of the resin component (solid content). Examples of the chain transfer agent include mercaptanes such as 1-dodecanethiol, mercaptoacetic acid, 2-mercaptoethanol, 2-ethylhexyl thioglycolate, and 2,3-dimethylcapto-1-propanol. Those chain transfer agents may be used alone or in combination.

The compounding ratio of the chain transfer agent is, for example, 0.001 to 0.5 part by weight with respect to 100 parts by weight of the monomer component.

Upon polymerization, the initiator and the chain transfer agent can be dissolved in the dispersion in advance. Alternatively, the initiator and the chain transfer agent can be dissolved in an aqueous medium (such as water) in advance, and the solution can be added to the emulsion. Alternatively, the initiator and the chain transfer agent can be directly compounded into the emulsion. It should be noted that a dissolved oxygen concentration in the monomer solution can be reduced by nitrogen replacement before or while the initiator is compounded. In addition, the emulsion is heated as required simultaneously with, or before or after the compounding of the initiator and the chain transfer agent. A heating temperature (polymerization temperature) is set to, for example, 5 to 100° C. A polymerization time is set to, for example, 1 to 30 hours. Such polymerization can provide an emulsion of a copolymer, i.e., the water dispersible pressure-sensitive adhesive composition. The median diameter on a volume basis of the copolymer can be substantially equal to the median diameter on a volume basis of the oil droplets. The median diameter is preferably 50 to 500 nm.

The water dispersible pressure-sensitive adhesive composition may be compounded with a cross-linking agent where necessary. Examples of the cross-linking agent include isocyanate-based cross-linking agent, epoxy-based cross-linking agent, oxazoline-based cross-linking agent, aziridine-based cross-linking agent, and metal chelate-based cross-linking agent. Those cross-linking agents may be oil-soluble or water-soluble cross-linking agents. Those cross-linking agents may be used alone or in combination. The compounding ratio of the cross-linking agent is, for example, 0.1 to 10 parts by weight with respect to 100 parts by weight the resin component of the water dispersible pressure-sensitive adhesive composition (solid content).

For the purpose of improving stability of the emulsion, a pH of the water dispersible pressure-sensitive adhesive composition is adjusted to, for example, 7 to 9, and preferably 7 to 8, by ammonia water or the like.

Additives, such as viscosity modifiers (for example, acrylic thickeners), release modifiers, plasticizers, softeners, fillers, colorants (for example, pigments, dyes), antioxidant, and surfactants may be appropriately added to the water dispersible pressure-sensitive adhesive composition if necessary. The compounding ratio of those additives is not specifically limited and can be appropriately set.

The gel fraction of the water dispersible pressure-sensitive adhesive composition (solid content) is, for example, 50 to 100 wt %, and preferably 70 to 100 wt %. When the gel fraction is less than the above-mentioned value, foaming and peeling may occur in the case where the resulting laminated optical film is used in a high-temperature and high-humidity atmosphere.

It should be noted that the gel fraction can be calculated by the following equation after the water dispersible pressure-sensitive adhesive composition was covered with a Teflon (trademark) sheet and immersed in ethyl acetate for 7 days:

Gel fraction (wt %)=(weight of water dispersible pressure-sensitive adhesive composition adhering to Teflon sheet after immersing/weight of water dispersible pressure-sensitive adhesive composition before immersing)×100

A method of forming the retardation layer is described later in the section B.

The refractive index anisotropy of the above-mentioned retardation layer can show the relationship of nx=ny>nz. Here, the relationship "nx=ny" comprehends not only the case where nx and ny are strictly equal to each other but also the case where nx and ny are substantially equal to each other. This is because of the following reason. That is, the crystal system of the inorganic laminar compound is of a planar structure, and hence the compound can be arrayed at random in an in-plane direction and parallel to the base material. The thickness direction birefringence index (Δnxz) of the retardation layer is preferably 0.002 to 0.02, or more preferably 0.004 to 0.02. Adjusting the amount in which the inorganic laminar compound is compounded can provide a desired Δnxz. The thickness direction retardation value (Rth[550]) of the retardation layer is preferably 30 to 350 nm, or more preferably 100 to 300 nm.

The retardation layer preferably has the relationship of 0.94≤R45[450]/R45[550]≤1.06, more preferably has the relationship of 0.95≤R45[450]/R45[550]≤1.05, or particularly preferably has the relationship of 0.96≤R45[450]/R45[550]≤1.04. In addition, the above-mentioned retardation layer preferably has the relationship of 0.94≤R45[650]/R45[550]≤1.06, more preferably has the relationship of 0.95≤R45[650]/R45[550]≤1.05, or particularly preferably has the relationship of 0.96≤R45[650]/R45[550]≤1.04. Inorganic compounds each tend to show such wavelength dispersion properties that retardations are substantially equal to each other at respective wavelengths (flat dispersion properties) because the inorganic compounds generally show such a tendency that their refractive index differences hardly increase or decrease over an entire wavelength region as compared with those of organic compounds. A retardation layer whose wavelength dispersion properties are flat dispersion properties can be obtained by favorably forming the inorganic laminar compound into a film.

The retardation layer can be excellent in transparency. The retardation layer has a haze of preferably 5% or less, or more preferably 2% or less. A haze in excess of 5% is not preferred because the retardation layer seems to be white (opaque) when viewed with the eyes.

The thickness of the retardation layer can be set to any appropriate value. The thickness is preferably 1 to 50 μm, more preferably 1 to 30 μm, or particularly preferably 20 to 30 μm. As described above, the use of the water dispersible pressure-sensitive adhesive composition allows one to control the thickness of the retardation layer within a wide range. As a result, the pressure-sensitive adhesive strength of the retardation layer can be easily controlled. Further, desired optical properties (such as a thickness direction retardation value (Rth)) can be easily obtained.

A-2. Polarizing Plate

The above-mentioned polarizing plate has at least a polarizer, and has a polarizer and a protective film placed on at least one side of the polarizer so as to be put into practical use.

A-2-1. Polarizer

As the polarizer, any suitable polarizers may be employed as the polarizer depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

A-2-2. Protective Film

As the protective film, any appropriate film which can be used as a protective film for a polarizer may be employed. Specific examples of a material used as a main component of the film include transparent resins such as a cellulose-based resin (such as triacetylcellulose (TAC)), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acrylic, urethane-based, acrylic urethane-based, epoxy-based, or silicone-based thermosetting resin or UV-curing resin. Still another example thereof includes a glassy polymer such as a siloxane-based polymer. Further, a polymer film described in JP 2001-343529 A (WO 01/37007) may also be used. To be specific, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin, and a glassy polymer are preferable, and TAC is more preferable.

The polarizing plate can further have a surface treated layer. The surface treated layer is typically formed on the side of the above-mentioned protective film where the above-mentioned polarizer is not placed. Specific examples of the surface treated layer include a hard coat treated layer, an antireflection treated layer, an anti-sticking treated layer, and an antiglare treated layer.

A-3. Others

The above-mentioned under coat layer is formed of a polymer containing, for example, an organic amino group, oxazoline group, epoxy group, or carbodiimide group. An oxazoline group-containing polymer is preferred. Examples of the polymer include an acrylic polymer and a styrene/acrylic polymer. Of those, the acrylic polymer is preferred. A general commercially available product is used as such oxazoline group-containing polymer, and examples of the commercially available product include EPOCROS series (such as an EPOCROS WS-700 manufactured by Nippon Shokubai Co., Ltd.).

The thickness of the under coat layer can be set to any appropriate value. The thickness is preferably 0.05 to 10 μm, or more preferably 0.1 to 7.0 μm.

Specific examples of the above-mentioned base material include synthetic resin films such as polyethylene, polypropylene, and polyethylene terephthalate; rubber sheet; paper; fabric; nonwoven fabric; net; foamed sheet; metal foil; and laminate thereof. The base material may function as a release sheet. The surface of the base material may be subjected to a treatment such as silicone treatment, long-chain alkyl treatment, or fluorine treatment so as to enhance releasability from the retardation layer.

B. Production Method

Any appropriate method can be adopted as a method of producing the laminated optical film of the present invention.

Hereinafter, an embodiment is described. For example, the retardation layer is formed on one side of the base material in advance. The retardation layer is typically formed by: applying the above-mentioned water dispersible pressure-sensitive adhesive composition onto one side of the base material; and drying the applied composition. Any appropriate method can be adopted as a method of applying the water dispersible pressure-sensitive adhesive composition. Examples of the method include knife coating, bar coating, roll coating, gravure coating, rod coating, slot orifice coating, curtain coating, and fountain coating. A drying temperature is preferably 30 to 200° C., or more preferably 50 to 180° C. A drying time is preferably 1 to 20 minutes, or more preferably 1 to 10 minutes. As described above, a retardation layer having excellent optical properties (such as flat dispersion properties) can be formed by a simple method.

Next, the retardation layer formed on the base material is laminated on the polarizing plate. Since the retardation layer functions as a pressure-sensitive adhesive layer as well, the retardation layer can be directly attached to the polarizing plate, and hence a production process can be simplified. Here, the pressure-sensitive adhesive layer and the polarizing plate may be laminated through the under coat layer. The under coat layer is preferably formed on the polarizing plate in advance. The under coat layer is formed by, for example, a method involving: applying a solution prepared by dissolving the above-mentioned polymer into a solvent onto the polarizing plate; and drying the applied solution. Examples of the solvent that dissolves the above-mentioned polymer include water and alcohols such as ethanol. The polymer concentration of the solution is preferably 0.1 to 10 wt %. The same method as the method of applying the water dispersible pressure-sensitive adhesive composition described above is employed as a method of applying the solution. A drying temperature is preferably 50 to 200° C. A drying time is preferably 1 to 5 minutes.

C. Liquid Crystal Panel

Figure 2:
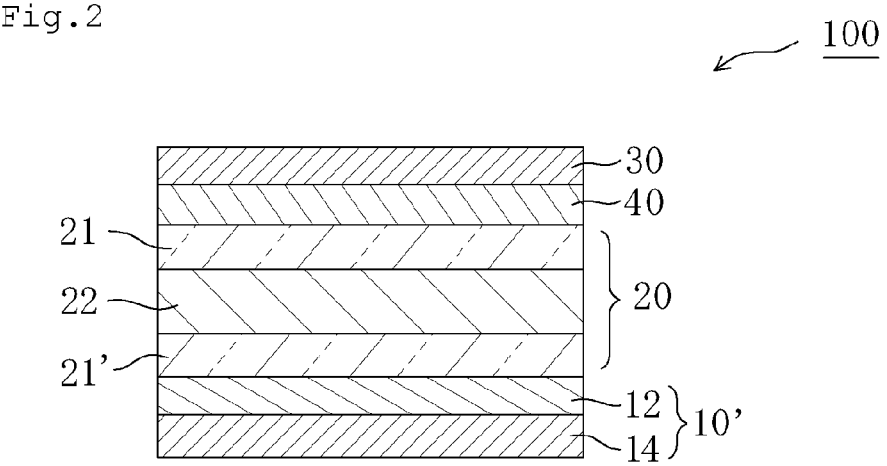
FIG. 2 is a schematic sectional view of a liquid crystal panel according to a preferred embodiment of the present invention.

A liquid crystal panel of the present invention has a liquid crystal cell and the above-mentioned laminated optical film placed on at least one side of the liquid crystal cell. FIG. 2 is a schematic sectional view of a liquid crystal panel 100 according to a preferred embodiment of the present invention. The liquid crystal panel 100 has: a liquid crystal cell 20; a laminated optical film 10' of the present invention placed on one side of the liquid crystal cell 20; a polarizing plate 30 placed on the other side of the liquid crystal cell 20; and a second retardation layer 40 placed between the laminated optical film 10' and the polarizing plate 30. The above-mentioned base material is released from the laminated optical film 10', and the retardation layer 12 of the film is attached to the liquid crystal cell 20.

In the illustrated example, the second retardation layer 40 is placed between the liquid crystal cell 20 and the polarizing plate 30. The second retardation layer 40 has any appropriate optical property. For example, the refractive index anisotropy of the second retardation layer 40 shows the relationship of $nx>ny=nz$ or the relationship of $nx>nz>ny$. Here, the relationship "$ny=nz$" comprehends not only the case where ny and nz are strictly equal to each other but also the case where ny and nz are substantially equal to each other. The use of the laminated optical film of the present invention can provide a liquid crystal panel excellent in screen contrast and showing a small color shift.

C-1. Liquid Crystal Cell

The liquid crystal cell 20 includes a pair of glass substrates 21, 21' and a liquid crystal layer 22 as a display medium placed between the substrates 21, 21'. On one substrate (color filter substrate), a color filter and a black matrix (both not shown) are provided. On the other substrate (active matrix substrate), switching elements (typically, TFT) for controlling the electrooptical characteristics of liquid crystal; scanning lines that provide a gate signal to the switching elements; signal lines that give a source signal thereto and pixel electrode are provided (all not shown). The color filter may be provided on the active matrix substrate. The gap (cell gap) between the substrates 21 and 21' is controlled with spacers (not shown). On each side of the substrates 21 and 21', which is in contact with the liquid crystal layer 22, an alignment film (not shown) made of, for example, polyimide is provided.

As the driving mode of the liquid crystal cell 20, any appropriate driving mode can be adopted. Specific examples of the driving mode include a super twisted nematic (STN) mode, a twisted nematic (TN) mode, an in-plane switching (IPS) mode, a vertical aligned (VA) mode, an optically aligned birefringence (OCB) mode, a hybrid aligned nematic (HAN) mode, an axially symmetric aligned microcell (ASM) mode, and an electrically controlled birefringence (ECB) mode. VA mode is preferred.

D. Liquid Crystal Display Apparatus

A liquid crystal display apparatus of the present invention has the above-mentioned liquid crystal panel. The liquid crystal display apparatus of the present invention is used in any appropriate application.

Hereinafter, the present invention is described specifically by way of examples. However, the present invention is not limited by these examples. It should be noted that the terms "part(s)" and "%" in the following description refer to "part(s) by weight" and "wt %", respectively unless otherwise stated.

Example 1

Preparation of Dispersion

First, 93 parts of butyl acrylate, 5 parts of acrylic acid, 2 parts of a mono[poly(propylene oxide) methacrylate]phosphate ester (PAM-200, average degree of polymerization of propylene oxide: about 5.0), 0.05 part of 3-methacryloyloxypropyl-trimethoxysilane (KBM-503 manufactured by Shin-Etsu Chemical Co., Ltd.), and 3 parts of hexadecane were loaded into a container, and then the contents were mixed. Next, 40 parts of a Rusentaito SPN (smectite whose gap between layers was subjected to a hydrophobic treatment with a quaternary ammonium salt having a propylene oxide skeleton at a ratio of 120 mol eq./q 100 g, maximum theoretical length of each layer: 50 nm, manufactured by Co-op Chemical Co., Ltd.) were added to the mixture, and then the whole was left to stand for 24 hours so that the Rusentaito SPN might be immersed in monomer components to swell. After that, the Rusentaito SPN was dispersed with an ultrasonic dispersing machine (GSD600CVP manufactured by GINSEN Co., Ltd.) for 10 minutes while the resultant was cooled in an ice bath. Thus, a dispersion was prepared.

(Preparation of Emulsion)

An aqueous solution prepared by dissolving 3 parts of an anionic emulsifier Hitenol LA-16 (nonreactive emulsifier, manufactured by Dai-ichi Kogyo Seiyaku Co., Ltd.) in 252 parts of ion-exchanged water was added to the above-mentioned dispersion, and then the aqueous solution and the dispersion were stirred with a Homomixer (manufactured by PRIMIX Corporation) for 1 minute at 6000 (1/min) so that forced emulsification might be performed. Subsequently, the resultant was subjected to a one-pass treatment with a high-pressure homogenizer (PANDA 2K) at a pressure of 100 MPa so that forced emulsification might be performed. Thus, an emulsion was prepared.

(Preparation of Water Dispersible Pressure-Sensitive Adhesive Composition)

The emulsion prepared in the foregoing was charged into a reaction vessel provided with a cooling pipe, a nitrogen-introducing pipe, a temperature gauge, and a stirring blade. Next, the air in the reaction vessel was replaced with nitrogen. After that, 4 parts of a 5% aqueous solution of hydrogen peroxide and 2.8 parts of a 5% aqueous solution of ascorbic acid were added to the emulsion, and then the mixture was subjected to emulsion polymerization at 20° C. for 24 hours. Thus, an emulsion of a copolymer having a resin solid content of 27% was obtained. Next, 10% ammonia water was added to the emulsion to adjust the pH to 8. Thus, a water dispersible pressure-sensitive adhesive composition was prepared.

(Formation of Retardation Layer)

The water dispersible pressure-sensitive adhesive composition obtained in the foregoing was applied onto a base material (polyethylene terephthalate base material, Diafoil MRF38, manufactured by Mitsubishi Polyester Film Corp.) with a fountain coater so that a thickness after drying might be 25±5 μm. After that, the resultant was subjected to a heat treatment in a circulating hot air oven at 120° C. for 5 minutes. Thus, a retardation layer was formed on the base material.

(Production of Polarizing Plate)

A polyvinyl alcohol film (having a thickness of 80 μm) was stretched in an aqueous solution of iodine at 40° C. so as to be five times as long as its original length. After that, the polyvinyl alcohol film was lifted from the aqueous solution of iodine, and was then dried at 50° C. for 4 minutes. Thus, a polarizer was obtained. A triacetylcellulose film as a protective film was attached to each side of the polarizer with a polyvinyl alcohol-based adhesive. Thus, a polarizing plate was obtained.

(Formation of Under Coat Layer)

An EPOCROS WS-700 (oxazoline group-containing acrylic polymer, manufactured by Nippon Shokubai Co., Ltd.) was diluted with a mixed solution of water and ethanol (at a weight ratio of 1:1) so that a solid content might be 0.25%. Thus, an application liquid for an under coat layer was prepared. The application liquid was applied onto one surface of the polarizing plate obtained in the foregoing with a Meyer Bar #5, and was then dried at 40° C. for 2 minutes. Thus, an under coat layer having a thickness of 0.1 μm was formed.

(Production of Laminated Optical Film)

The retardation layer formed on the base material described above was attached to the side of the above-mentioned polarizing plate where the under coat layer was formed. Thus, a laminated optical film was obtained.

Example 2

A laminated optical film was produced in the same manner as in Example 1 except that the amount in which the Rusentaito SPN was compounded in the preparation of a dispersion was changed to 80 parts.

Comparative Example 1

A polarizing plate was produced in the same manner as in Example 1 except that a retardation layer was formed of the following pressure-sensitive adhesive composition.

(Preparation of Pressure-Sensitive Adhesive Composition)

First, 100 parts by weight of butyl acrylate, 5 parts by weight of acrylic acid, 0.075 part by weight of 2-hydroxyethyl acrylate, and 0.3 part by weight of 2,2'-azobisisobutyronitrile were loaded together with ethyl acetate into a reaction vessel provided with a cooling pipe, a nitrogen-introducing pipe, a temperature gauge, and a stirring apparatus, and then the mixture was subjected to a reaction in a stream of a nitrogen gas at 60° C. for 4 hours. After that, ethyl acetate was added to the reaction liquid. Thus, a solution containing an acrylic base polymer having a weight-average molecular weight of 2,200,000 (solid content concentration: 30 wt %) was obtained. Then, 0.6 part by weight of a cross-linking agent having an isocyanate group (trade name: Coronate L, manufactured by Nippon Polyurethane Industry Co., Ltd.), 0.075 part by weight of γ-glycidoxypropyltrimethoxysilane (trade name: KBM-403, manufactured by Shin-Etsu Chemical Co., Ltd.), and 40 parts by weight of a Rusentaito SPN were compounded into 100 parts by weight of the solid content of the acrylic base polymer solution. Thus, a pressure-sensitive adhesive composition was obtained.
(Formation of Retardation Layer)

The pressure-sensitive adhesive composition obtained in the foregoing was applied onto a base material with a fountain coater so that a thickness after drying might be 25±5 μm. After that, the resultant was subjected to a heat treatment in a circulating hot air oven at 155° C. for 70 seconds. Thus, a retardation layer was formed on the base material.

Comparative Example 2

A polarizing plate was produced in the same manner as in Example 1 except that: the following film was used as a retardation layer; and the retardation layer and the polarizing plate were laminated through the following pressure-sensitive adhesive layer.
(Retardation Layer)

First, 17.77 g (40 mmol) of 2,2'-bis(3,4-dicarboxyphenyl) hexafluoropropanoic dianhydride (manufactured by Clariant Japan) and 12.81 g (40 mmol) of 2,2-bis(trifluoromethyl)-4,4'-diaminobiphenyl (manufactured by Wakayama Seika Kogyo Co., Ltd.) were loaded into a reaction vessel (500 mL) provided with a mechanical stirring apparatus, a Dean-Stark apparatus, a nitrogen-introducing pipe, a temperature gauge, and a cooling pipe. Subsequently, a solution prepared by dissolving 2.58 g (20 mmol) of isoquinoline in 275.21 g of m-cresol was added to the mixture, and then the whole was stirred at 23° C. for 1 hour (600 rpm). Thus, a uniform solution was obtained. Next, the reaction vessel was heated with an oil bath so that the temperature in the reaction vessel might be 180±3° C. Then, the solution was stirred for 5 hours while the temperature was kept. Thus, a yellow solution was obtained. After the solution had been stirred for an additional three hours, the heating and the stirring were terminated, and then the reaction vessel was left standing to cool so that the temperature might be returned to room temperature. As a result, a polymer precipitated in a gel form.

Acetone was added to the yellow solution in the reaction vessel described above to dissolve the above-mentioned gel completely. Thus, a diluted solution (7 wt %) was produced. The diluted solution was gradually added to 2 L of isopropyl alcohol while isopropyl alcohol was continuously stirred. As a result, a white powder precipitated. The powder was taken by filtration, and was then loaded into 1.5 L of isopropyl alcohol so as to be washed. Further, the same operation as the foregoing was repeated again so that the powder might be washed. After that, the powder was taken by filtration again. The powder was dried in an air-circulating thermostatic oven at 60° C. for 48 hours, and was then dried at 150° C. for 7 hours. Thus, a powder of a polyimide represented by the following structural formula (I) was obtained in 85% yield.

The above-mentioned polyimide had a weight-average molecular weight (Mw) of 124,000 and an imidation ratio of 99.9%.

The above-mentioned polyimide powder was dissolved in methyl isobutyl ketone so that a 15-wt % polyimide solution might be prepared. The polyimide solution was subjected to uniform flow-casting in a sheet form on the surface of a triacetylcellulose film (having a thickness of 80 μm) with a slot die coater. Next, the film was placed in a multi-chamber, air-circulating drying oven, and then the solvent was evaporated while the temperature of the film was gradually increased from low temperatures as described below. In other words, the temperature was kept at 80° C. for 2 minutes, at 135° C. for 5 minutes, and at 150° C. for 10 minutes.

Thus, a retardation layer having a thickness of 3 μm was provided on the triacetylcellulose film. The retardation layer had the following optical properties. In other words, nx=ny>nz, Re[550]≈0 nm, Rth[550]=120 nm, R45[450]/R45[550]=1.06, and R45[650]/R45[550]=0.97.

[Chem 4]

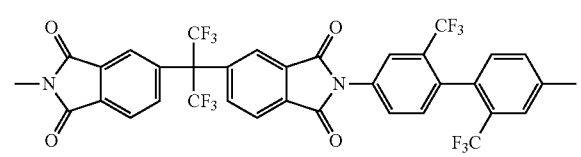

(I)

(Pressure-Sensitive Adhesive Layer)

First, 100 parts by weight of butyl acrylate, 5 parts by weight of acrylic acid, 0.075 part by weight of 2-hydroxyethyl acrylate, and 0.3 part by weight of 2,2'-azobisisobutyronitrile were loaded together with ethyl acetate into a reaction vessel provided with a cooling pipe, a nitrogen-introducing pipe, a temperature gauge, and a stirring apparatus, and then the mixture was subjected to a reaction in a stream of a nitrogen gas at 60° C. for 4 hours. After that, ethyl acetate was added to the reaction liquid. Thus, a solution containing an acrylic base polymer having a weight-average molecular weight of 2,200,000 (solid content concentration: 30 wt %) was obtained. Then, 0.6 part by weight of a cross-linking agent having an isocyanate group (trade name: Coronate L, manufactured by Nippon Polyurethane Industry Co., Ltd.), 0.075 part by weight of γ-glycidoxypropyltrimethoxysilane (trade name: KBM-403, manufactured by Shin-Etsu Chemical Co., Ltd.) were compounded into 100 parts by weight of the solid content of the acrylic base polymer solution. Thus, a pressure-sensitive adhesive composition was obtained.

The resultant pressure-sensitive adhesive composition was uniformly applied onto the surface of a base material with a fountain coater, and was then dried at 155° C. for 70 seconds. Thus, a pressure-sensitive adhesive layer having a thickness of 25 μm was formed.

Comparative Example 3

A polarizing plate was produced in the same manner as in Comparative Example 2 except that the following film was used as a retardation layer.
(Retardation Layer)

A continuous norbornene-based resin film (manufactured by JSR Corporation, trade name: ARTON FILM, thickness: 100 μm) was subjected to dry stretching at 175° C. in its lengthwise direction at a ratio of 1.15. After that, the film was subjected to dry stretching at 175° C. in its widthwise direction (direction perpendicular to the lengthwise direction) at a ratio of 1.335, and alleviation was performed so that the length in the lengthwise direction might be 0.975 time as long as the length in the widthwise direction after the stretching treatment. As a result of such treatment, a film having a thickness of 75 µm was obtained. The film had the following optical properties. In other words, nx=ny>nz, Re[550]≈0 nm, Rth[550]=90 nm, R45[450]/R45[550]=1.005, and R45[650]/R45[550]=0.995.

The retardation layers obtained in the respective examples and comparative examples were evaluated for the following items. Table 1 summarizes the results of the evaluation.

<Optical Properties>

Optical properties such as a birefringence index and wavelength dispersion properties (R45[450]/R45[550] and R45[650]/R45[550]) were measured with an apparatus available under the product name "AxoScan" from Axometrics at 23° C. The wavelength dispersion properties were measured by tilting a sample by 45° from its normal direction.

It should be noted that the optical properties of only the retardation layer (film) were measured in each of Comparative Examples 2 and 3.

<Pressure-Sensitive Adhesive Strength>

A sample piece (base material/retardation layer) that had been cutout so as to have dimensions measuring 25 mm by 25 mm was attached to a glass plate (Corning #1737 manufactured by Corning Incorporated), and was then crimped with a rubber roller having a load of 2 kg. The resultant was left to stand in an autoclave at 58° C. and 0.5 MPa for 15 minutes, and was then left standing to cool to 25° C. After that, a 90-degree peeling adhesive strength (300 mm/min) was measured.

It should be noted that the pressure-sensitive adhesive strength of the pressure-sensitive adhesive layer was measured in each of Comparative Examples 2 and 3.

TABLE 1

| | Birefringence index Δnxz | Wavelength dispersion properties | | Pressure-sensitive adhesive strength (N/25 mm) |
|---|---|---|---|---|
| | | Re45[450]/Re45[550] | Re45[650]/Re45[550] | |
| Example 1 | 0.004 | 1.02 | 0.96 | 5 |
| Example 2 | 0.01 | 1.02 | 0.98 | 2 |
| Comparative Example 1 | — | — | — | — |
| Comparative Example 2 | 0.04 | 1.06 | 0.97 | 8 |
| Comparative Example 3 | 0.001 | 1.01 | 0.995 | 8 |

In each of Examples 1 and 2, a retardation layer having the following optical properties was obtained. In other words, nx=ny>nz and Re[550]≈0 nm. In addition, as shown in Table 1, the wavelength dispersion properties of each of the resultant retardation layers were flat dispersion properties.

On the other hand, in Comparative Example 1, a retardation layer was formed with a solvent-based pressure-sensitive adhesive, but the layer was impossible to be evaluated because the layer became opaque owing to layer separation.

The pressure-sensitive adhesive strength of the retardation layer of each of Examples 1 and 2 was at such a level that no problems occurred in practical use, though the pressure-sensitive adhesive strength slightly paled beside the pressure-sensitive adhesive strength of the pressure-sensitive adhesive layer of each of Comparative Examples 2 and 3.

In view of the foregoing, it can be said that favorable formation of a retardation layer bringing together an excellent optical compensation function and a pressure-sensitive adhesive function was attained by forming an inorganic laminar compound into a film with a water dispersible pressure-sensitive adhesive composition, and hence the thinning of a liquid crystal panel and the simplification (cost reduction) of a production process for the panel were achieved.

The laminated optical film and liquid crystal panel of the present invention can each be suitably used in a liquid crystal display apparatus.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A laminated optical film, comprising:
   a polarizing plate; and
   a retardation layer comprising a water dispersible pressure-sensitive adhesive composition containing an inorganic laminar compound;
   wherein the retardation layer has a thickness direction birefringence index Δnxz of 0.002 to 0.02; and
   wherein a content of the inorganic laminar compound in the retardation layer is 30 to 200 parts by weight with respect to 100 parts by weight of a resin solid content;
   wherein a resin component in the water dispersible pressure-sensitive adhesive composition comprises at least one resin selected from the group consisting of a (meth) acrylic resin, a polyurethane-based resin, a polyester-based resin, a phenol resin, an ethylene-vinyl acetate resin, an epoxy resin, and a silicone resin; and
   wherein the water dispersible pressure-sensitive adhesive composition is an emulsion of a polymer.

2. A laminated optical film according to claim 1, wherein the retardation layer has relationships represented by the following expressions (1) and (2):

$$0.94 \leq R45[450]/R45[550] \leq 1.06 \quad (1)$$

$$0.94 \leq R45[650]/R45[550] \leq 1.06 \quad (2)$$

where R45[450], R45[550], and R45[650] represent retardation values measured by tilting the layer by 45° from its normal direction at 23° C. and wavelengths of 450 nm, 550 nm, and 650 nm, respectively.

3. A laminated optical film according to claim 1, wherein the retardation layer has a refractive index anisotropy of nx=ny>nz.

4. A laminated optical film according to claim 1, wherein the retardation layer has a thickness of 1 to 50 µm.

5. A laminated optical film according to claim 1, wherein the inorganic laminar compound comprises at least one kind of a clay-based mineral selected from the group consisting of a kaolinite group, an antigorite group, a smectite group, a vermiculite group, and a mica group.

6. A laminated optical film according to claim 1, wherein the inorganic laminar compound is subjected to a hydrophobic treatment.

7. A laminated optical film according to claim 1, wherein the resin component comprises a (meth)acrylic resin.

8. A liquid crystal panel, comprising:
   a liquid crystal cell; and
   the laminated optical film according to claim 1.

9. A liquid crystal display apparatus comprising the liquid crystal panel according to claim 8.

* * * * *